Patented Feb. 27, 1934

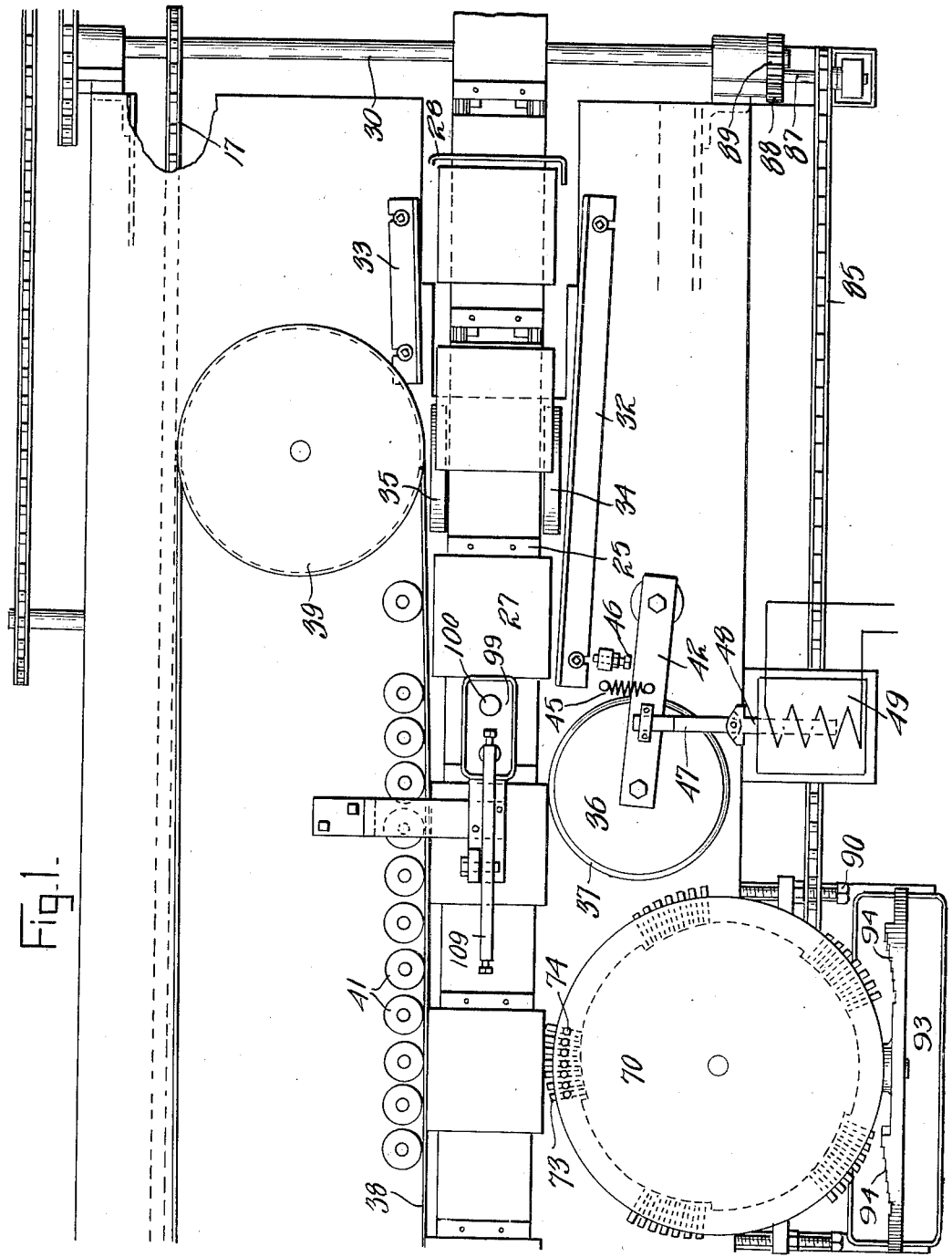

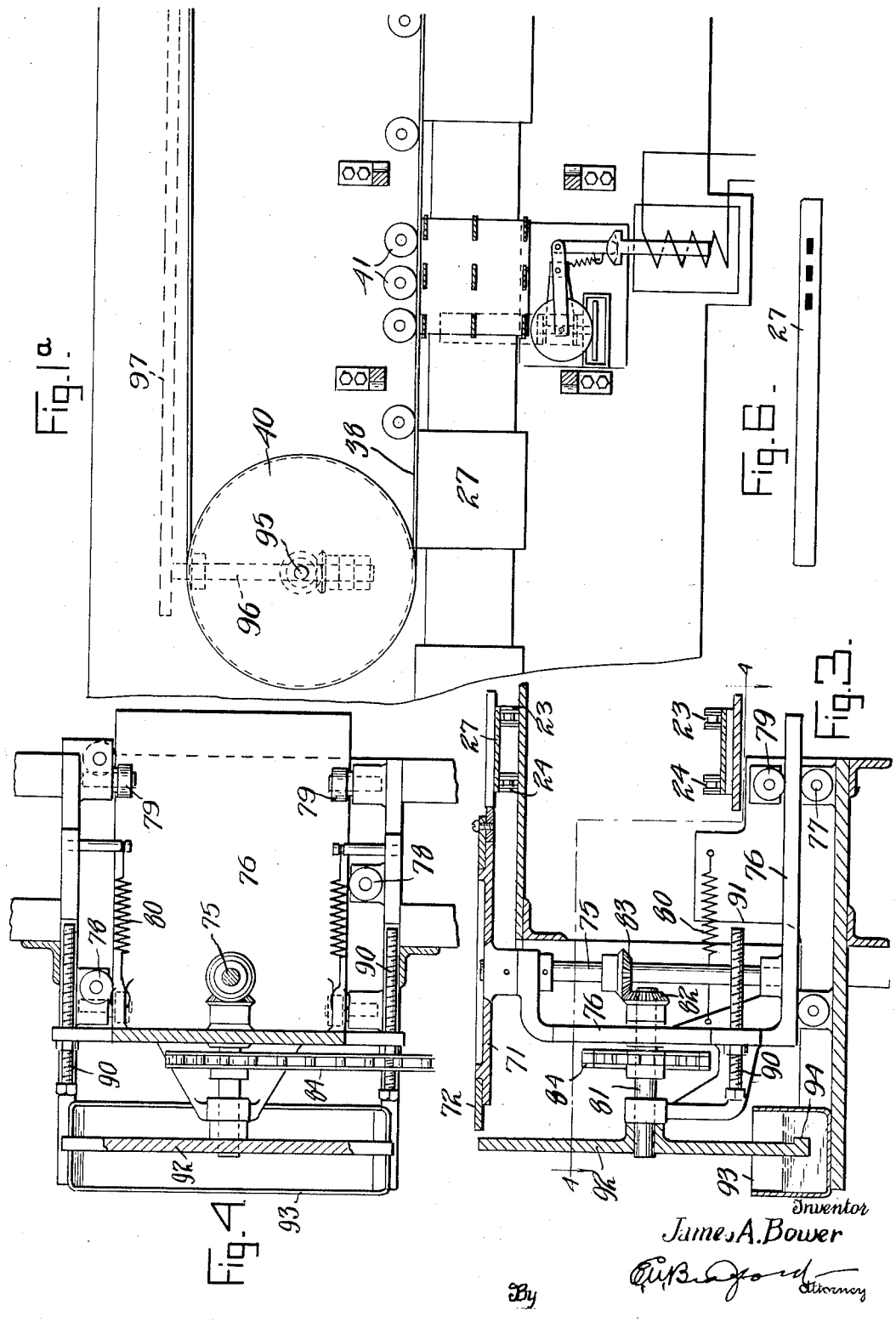

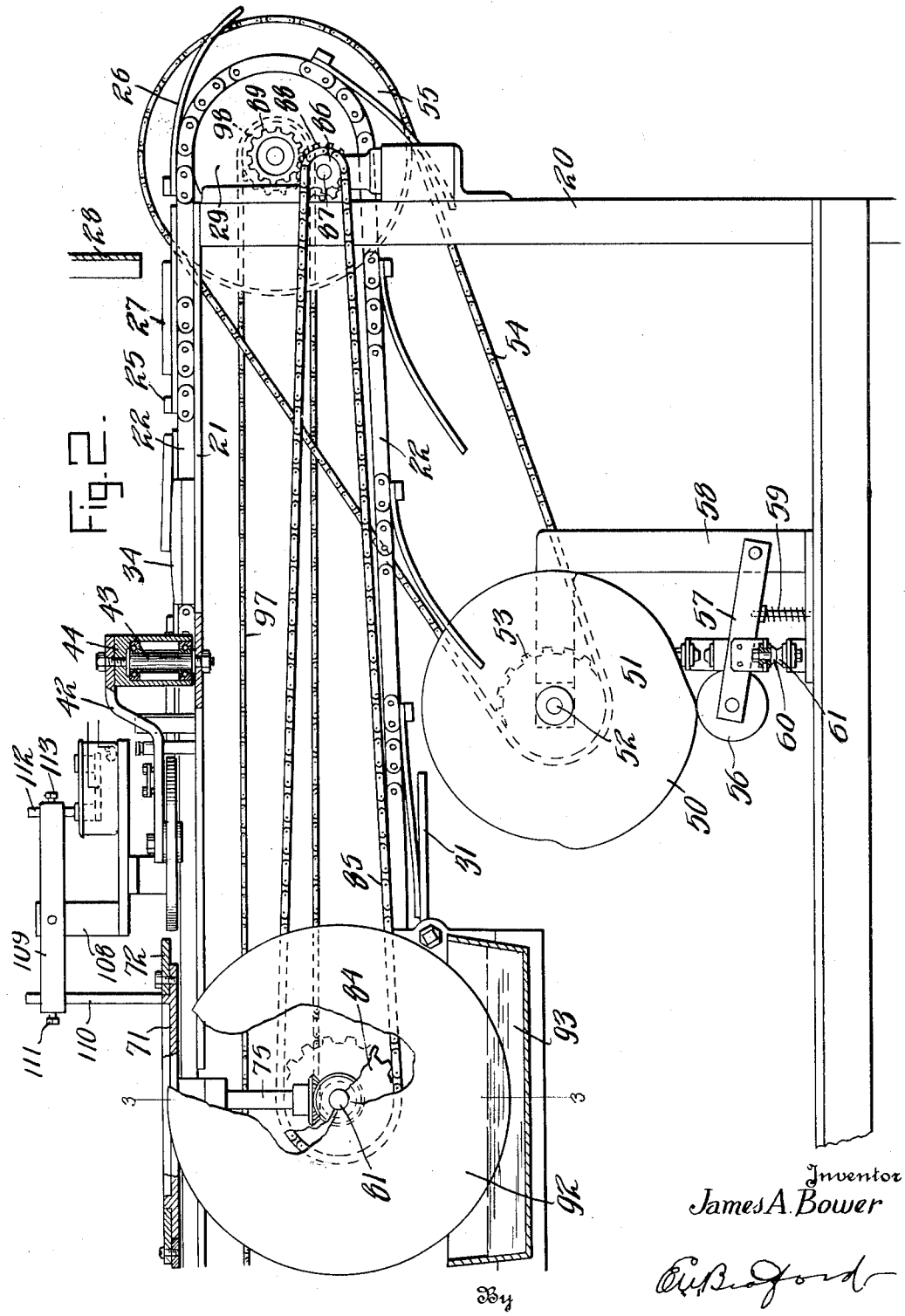

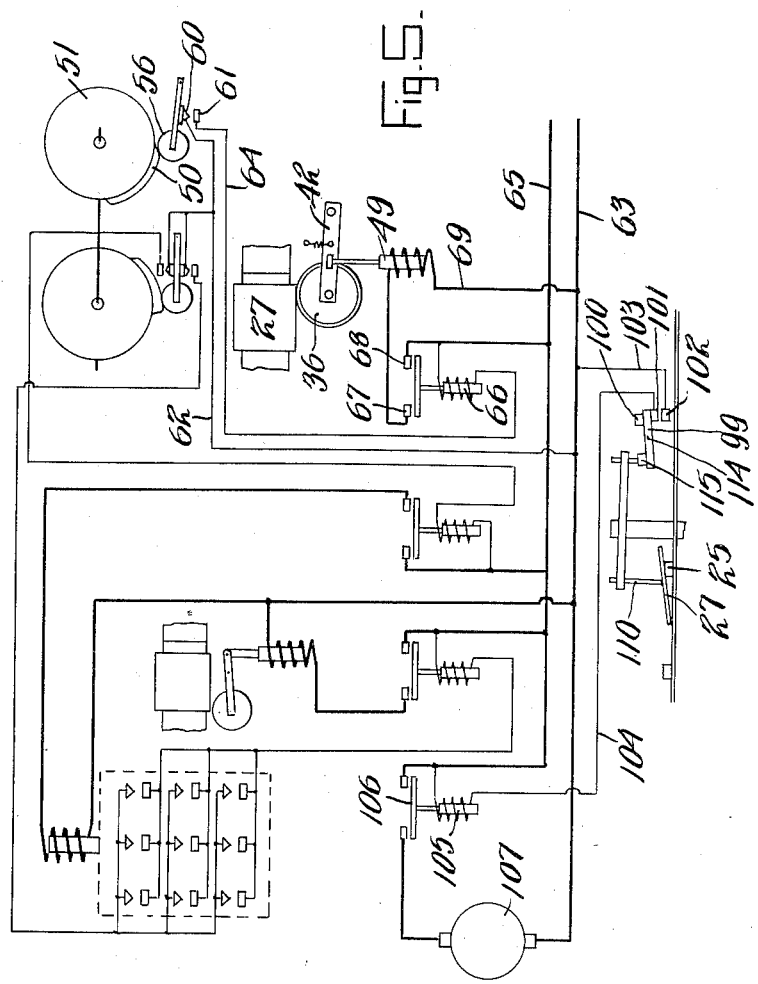

1,948,782

UNITED STATES PATENT OFFICE 1,948,782

TILE WIDTH OR LENGTH MEASURING AND MARKING MACHINE

James Arthur Bower, Anderson, Ind., assignor to The National Tile Company, Anderson, Ind., a corporation of Ohio Application June 1, 1931. Serial No. 541,495

12 Claims. (Cl. 101—35)

This invention relates to machines for grading tile and marking them in accordance with variations in width or length.

An object of the invention is to provide a machine which will accurately grade and mark all tile which exceed a predetermined width or length and to further provide a machine which will be automatically stopped when the tile are misplaced in the machine.

A further object of the invention is to provide a machine for marking tile in which the marking is done while the tile are moving continuously through the machine.

Referring to the accompanying drawings which are made a part hereof and on which similar reference characters indicate similar parts, Figures 1 and 1a are plan views of that portion of a tile conveying machine upon which the grading and the marking apparatus of the present invention are mounted, Figure 2 is a side elevation of the same, Figure 3, a section on line 3—3 of Figure 2, Figure 4, a section on line 4—4 of Figure 3, Figure 5, a diagrammatic view showing diagrammatically the operating circuits for the various elements, and Figure 6 shows the edge of a tile with the width markings thereon.

This invention must be considered in connection with the tile conveying, grading and marking machine shown in my co-pending application Ser. No. 541,496 filed June 1, 1931 for Tile feeder machines.

The invention in this case deals with that portion of the machine for marking the tile. Only so much of the machine referred to above will be described as is necessary for an understanding of the marking and grading apparatus forming the subject matter of the present case.

A frame 20 carries a plate 21 which forms a flat table top upon which a tile conveyor 22 runs. The conveyor is formed of a pair of chains 23 and 24 across which are attached cleats 25. Flexible pads 26 are attached to the cleats, upon which pads tile 27 are delivered from a chute 28, this chute being a part of the machine of the application above referred to. The conveyor chains travel over sprockets, one of which is shown at 29 which sprockets are mounted on shaft 30. The shaft 30 is journaled in the end of the frame 20 and the cleats 25 also act as drivers for the tile as will presently appear. Sprocket chains 23 and 24 are driven by a sprocket not shown at the delivery end of the frame 20. The conveyor 22 returns under the table 21 and is supported on its return by a plate 31 attached to the frame 20. At each side of the conveyor chain are positioned adjustable guides 32 and 33 which serve to position the tile on the conveyor in a relatively even manner. At each side of the conveyor are provided rails 34 and 35 upon which the tile attempt to slide as they are carried forward by the conveyor. The rails retard the forward progress of the tile due to the friction until the cleats 25 engage the rear edge of the tile and propel the tile forward over the rails. These rails are only slightly above the level of the pads 26 so after the tile has passed over the rails it is seated rearwardly against the edge of the cleat 25 as shown in Figure 1. As the tile move forward they come opposite a wheel 36 which tends to move them laterally to position them in a straight line. The wheel 36 has a padded rim 37 to prevent injury to the edge of the tile.

An aligning belt 38 travels around a pulley 39 at one end and is driven by a pulley 40 at its other end. This belt is preferably a thin metal band so as to eliminate friction against the sides of the tile and is held in correct aligned position by means of a number of rollers 41 which are mounted on the frame of the machine. The belt 38 runs continuously at the same speed as the conveying belt. At the entering side the belt travels toward the conveyor at a slight angle. The belt 38 at a point substantially opposite the wheel 36 becomes parallel to the conveyor 22. This insures in conjunction with the wheel 36 that the tile shall be brought in proper alignment with units later in the travel of the tile by which units they are treated as will be later described.

The wheel 36 is supported at the end of an arm 42 which is attached to a shell 43 which is pivoted upon a stud 44 which stud is attached to the table 21. The arm 42 is drawn toward the tile by means of a spring 45 which is secured to the arm and to the frame of the machine. An adjustable screw 46 limits movement of the arm toward the tile. A strap 47 is secured to the arm 42 and to the end of an armature 48 of a solenoid 49. The solenoid is timed to pull the wheel 36 away from the edge of a tile 37 just before the trailing edge of the tile comes opposite the center of the wheel, as shown in Figure 1. When the spaces between the tile 27 are opposite to wheel 36 the wheel is led in within the line of the edge of the tile a slight amount so as to further tend to settle the tile against the band 38 so that they will be accurately positioned when they reach the marking devices. The solenoid 49 which controls the position of the wheel 36 is itself controlled by a cam 50 on a cam wheel 51. The cam wheel 51 is mounted on a shaft 52 which carries a sprocket 53. The sprocket 53 is driven by means of a sprocket chain 54 from a sprocket 55 mounted on the shaft 30. The cam 50 engages a cam follower 56 on the outer end of an arm 57 which is pivoted to a bracket 58 secured to the frame of the machine. Spring 59 holds the cam follower against the periphery of the cam 50. The arm 57 carries a contact 60, this contact being insulated from the arm. The contact 60 from time to time is brought into engagement with a contact 61 secured on bracket 58 and insulated therefrom. A wire 62 connects contact 60 with a power line 63 and a line 64 connects contact 61 with a power line 65, the line 64 passing around a solenoid core 66 to energize this solenoid and close contact across points 67 and 68 to close the circuit from the power line 63 through line 69 with power line 65 to energize the solenoid 49 which controls the wheel 36. When contacts 60 and 61 are closed the solenoid 49 is energized so that the wheel 36 is withdrawn from contact with the edge of the tile. The driving connection between sprocket 55 and sprocket 53 is such that the cam wheel 51 makes one revolution while the conveyor moves a distance equal to the distance between two cleats 25, i. e. the cam makes one rotation while a tile moves the distance between each tile space. After leaving the wheel 36 the tile are accurately positioned on the conveyor belt by which they are carried to be marked according to width by the marker 70 which will now be described. The marker consists of a wheel 71 to the flanged rim of which is attached a ring 72. Markers 73 are attached to the ring by means of screws 74. The outer ends of the markers are located so as to come into contact with the edge of the tile which tile are held in proper alignment by the belt 38 and the rollers 41. The periphery of the wheel 71 is spirally cut so that the markers of each group assume a spiral radial progression relative to the axis of the wheel 71. The marker which has the shortest radius will be the first in position to make contact with the edge of a tile, provided the tile is of the largest size or large enough to contact all the markers. The remainder of the markers will follow in close proximity to the edge of the tile. As shown there are seven markers. This permits the grading of the tile into eight grades according to the width, the grades being those receiving no mark at all, which will be the very narrow tile, and those receiving 1, 2, etc. up to 7 marks. The radius of the contact marker faces has a peripheral speed substantially the same as the conveyor 22. As shown the wheel 71 has five groups of tile markers mounted thereon. The use of five groups of markers of course is arbitrary. It is desirable, however, to have quite a number of groups. If there were only one or two groups there would be an increase in angular contact which would cause rougher action and injure unduly the tile and the markers. It is advisable therefore to have a relatively large marker wheel and in this case advisable to have as many groups of markers thereon as the wheel will conveniently carry. The wheel 71 is mounted on a vertical shaft 75 which is journaled in the frame of a carriage 76. This carriage is supported on rollers 77 and guided between rollers 78. Guide rollers 79 positioned above the base of the carriage serve further to hold the carriage in position while in operation. The rollers 77, 78 and 79 are all journaled in the base of the machine and attached to the frame 20. The carriage 76 is permitted to travel outward from the edge of the tile as the tile pass opposite the spirally disposed markers 73. Spring 80 tends to move the carriage in the direction of the edge of the tile. The shaft 75 is driven from a shaft 81 through bevel gears 82 and 83. The shaft 81 carries a sprocket 84 which sprocket is driven by a sprocket chain 85. The sprocket chain 85 is driven by a sprocket 86 on a shaft 87 which carries a pinion 88 meshing with a pinion 89 on the shaft 30. An adjustable screw 90 is threaded through a portion of the carriage and engages with a part 91 of the frame to limit movement of the carriage toward the tile. The purpose of the adjusting screw is to set the carriage so that the markers 73 on the wheel 71 are the proper distance from the band 38. The distance being measured where the marker coincides with a perpendicular line from the flat edge of the band 38 to the axis of the wheel 73. The distance thus measured between successive markers and the band correspond to predetermined lengths according to size. The difference in length between sizes is usually $\frac{1}{32}''$. This may be changed to suit different gradings by changing the radial progression of the wheel 71. The machine may be readily changed to grade tile of different type sizes such as 4" square to 2" square. This would be accomplished by moving both the band assembly and the marking assembly each one inch farther away from the center of the belt. The outer end of the shaft 81 carries an inking disk 92 the periphery of which dips into a well of ink 93 which well is secured upon the frame of the machine. The inking disk preferably has stepped faces 94 on one side next to the markers and registering therewith as the disk and markers rotate together for transferring a portion of the ink to the ends of the markers. The belt 38 passes around a pulley 40 in order to hold the tile in position so that they may be marked by a warp detector unit shown and described in my Patent No. 1,910,461, granted May 23, 1933 for Means for detecting and marking warped tile.

The pulley 40 is fixed to a vertical shaft 95 projecting through the table 21 and is driven by a bevel gear through a shaft 96. The shaft 96 is driven by a sprocket chain 97 traveling over a sprocket 98 on the shaft 30. Shown diagrammatically in Figure 5 is a starting and stopping switch 99 upon which is a starting button 100. The switch 99 carries a contact 101 which is adapted to be brought into engagement with contact 102. A wire 103 connects contact 102 with power line 63 and a wire 104 connects contact 101 through a solenoid 105 with power line 65. When the contacts 101, 102 are brought together circuit is closed through lines 63 to 65 to energize the solenoid and close switch 106 to close circuit through power lines 63 and 65 with the main operating motor 107.

Mechanism is also provided for stopping the motor when a tile is improperly placed on a conveyor, such for example as when the edge of a tile rests upon one of the cleats 25. This stopping mechanism is shown mounted upon the machine in Figures 1 and 2 and comprises a bracket 108 to which is pivotally attached a rocker lever 109. The end of this lever carries a rod 110 secured in vertically adjusted position by means of a screw 111. The other end of the lever carries a pin 112 which is adjusted and secured in position by screw 113. A switch 99 is pivoted at 114. The lower end of the rod 112 is adapted to engage a button 115 on the free end of the switch so that when a tile 27, as shown in Figure 5, rides upon one of the cleats 25 the end of the rod 110 rides upon the face of the raised tile and 109 is raised to depress the free end of the switch lever 99 to open contacts 101 and 102 to stop operation of the motor 107. Should a tile be permitted to ride up in the manner shown in Figure 5 it would be jammed under warp detecting mechanism used in connection with a machine shown and described in the copending application directed to detecting mechanism for warped tile.

While the machine has been described as a tile width and length measuring and marking machine it is not limited to tile but may be used with any article whose shape is such as to be handled and marked by the machine. The tile may be positioned either lengthwise or crosswise of the conveyor belt so that the machine will operate as either a width or a length measuring and marking machine.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. A machine for grading tile according to width comprising a frame having a table mounted thereon, a conveyor belt movable across the table, means for feeding tile to the said conveyor and for aligning them on the conveyor, and a disk having a plurality of markers of different lengths mounted thereon and engageable with an edge of the tile to mark it in accordance with its width, a support for said disk said support being movable at right angles to the direction of travel of the conveyor belt, substantially as set forth.

2. A machine for grading tile according to width comprising a frame having a table mounted thereon, a conveyor belt movable across the table, means for feeding tile to the said conveyor and for aligning them on the conveyor, and a disk having a plurality of markers of different lengths mounted thereon and engageable with an edge of the tile to mark it in accordance with its width, said disk being movable at right angles to the direction of travel of the said conveyor by engagement of the markers with the side of the tile as they vary in width from one to another.

3. A tile grader comprising a conveyor belt adapted to receive tile, a plurality of cleats secured to said belt in spaced apart relation, means for feeding tile to the said belt between the cleats, means engageable with the side of the belt to align the tile along one side, a roller engageable with the other side of the tile to press them into engagement with the last named means, and means for positioning the tile against the forward edge of the said cleats to position the tile to receive width markings in a predetermined position on the tile, substantially as set forth.

4. A tile grader comprising a conveyor belt adapted to receive tile, a plurality of cleats secured to said belt in spaced apart relation, means for feeding tile to the said belt between the cleats, means engageable with the side of the belt to align the tile along one side, a roller engageable with the other side of the tile to press them into engagement with the last named means, and means for positioning the tile against the forward edge of the said cleats to position the tile to receive width markings in a predetermined position on the tile, substantially as set forth.

5. A tile grading machine comprising a conveyor, means for driving the conveyor, means for delivering tile to the conveyor, means for aligning the tile on the conveyor, a disk engageable with one edge of the tile, said disk carrying marking stencils, means for inking said stencils, said disk being movable toward and from the edge of the tile to cause the stencils to mark the edge of the tile a number of times corresponding to predetermined width grades, substantially as set forth.

6. In a tile grading machine, a tile marking device comprising a frame movable toward and from the axis of a conveyor belt, a shaft carried by said frame, a disk on said shaft, said disk having a plurality of marking stencils secured thereon in different radial projections, means for inking said stencils, said means having opposite edges to engage each of said stencils alike, and means for adjusting the movement of said frame toward the said conveyor to limit the number of marks on the edge of a given tile, substantially as set forth.

7. In a tile grading machine, a rotatable disk, means for marking the edge of the tile to indicate predetermined grades of tile, means for backing up the opposite edge of the tile during the marking comprising a traveling frictionless metallic belt, a plurality of rollers backing up said belt, said belt and said rollers holding the tile in proper position during the marking of the edge of a tile to indicate its width, substantially as set forth.

8. In a tile grading machine a conveyor belt having cleats thereon, means for feeding tile to the belt, means for aligning the edge of the tile in proper parallel relation with the belt, an intermittently operated roller for holding the tile properly aligned and for positioning the tile against the cleats on the conveyor and a wheel having marking stencils thereon engageable with the side of a tile, said wheel being operable toward and from the traveling belt in accordance with variations in the width of the tile said stencils indicating predetermined standards in width, means for inking said stencils, said inking means having offset radial flanges for inking all of said stencils, substantially as set forth.

9. Means for grading tile according to width or length comprising a movable conveyor belt, an aligning and backing up belt movable at the same speed as the conveyor belt and lying in a plane at right angles to the plane of the conveyor belt, a marking device having marking stencils thereon engageable with an edge or an end of the tile, the number of stencils engaging the tile being determined by the width or length of the tile, substantially as set forth.

10. Means for grading tile according to width or length comprising a movable conveyor belt, an aligning and backing up belt movable at the same speed as the conveyor belt and lying in a plane at right angles to the plane of the conveyor belt, a marking device having marking stencils thereon engageable with an edge or an end of the tile, the number of stencils engaging the tile being determined by the width or length of the tile, the marking of the tile being done during the continuous travel of the tile, substantially as set forth.

11. A tile width or length measuring machine comprising the combination of a continuously movable conveyor belt of a second belt movable at the same speed as the conveyor belt and being positioned so that one side will engage a side or end of a tile depending on the position of the tile, and means comprising a rotating disk having graduated stencils for marking the edge of the tile according to its length or width, substantially as set forth.

12. A tile width or length measuring machine comprising the combination of a continuously movable conveyor belt of a second belt movable at the same speed as the conveyor belt and being positioned so that one side will engage a side or end of a tile depending on the position of the tile, and means for marking the edge of the tile according to its length or width, said last named means comprising a disk having a plurality of sets of stencils of different effective lengths, said stencils impressing marks on the tile in accordance with a predetermined standard to indicate the relative widths or lengths of the tile, substantially as set forth.

JAMES ARTHUR BOWER.